US007640084B2

(12) United States Patent
Musser

(10) Patent No.: US 7,640,084 B2
(45) Date of Patent: Dec. 29, 2009

(54) METHOD AND SYSTEM FOR ADAPTIVELY CONTROLLING A HYBRID VEHICLE

(75) Inventor: James William Musser, Charlotte, NC (US)

(73) Assignee: Deere & Company, Moline, IL (US)

( * ) Notice: Subject to any disclaimer, the term of this patent is extended or adjusted under 35 U.S.C. 154(b) by 204 days.

(21) Appl. No.: 11/371,598

(22) Filed: Mar. 9, 2006

(65) Prior Publication Data

US 2007/0213891 A1 Sep. 13, 2007

(51) Int. Cl.
  *B60L 11/00* (2006.01)
  *B60K 1/00* (2006.01)
  *H02P 1/54* (2006.01)

(52) U.S. Cl. ............................. 701/22; 701/35; 701/36; 180/65.1; 180/65.2; 180/65.3; 180/290; 903/903; 903/940; 903/941; 903/942; 903/943; 903/944; 903/945; 903/946; 318/53; 318/700; 318/712; 318/717; 318/798

(58) Field of Classification Search .................... 701/1, 701/22, 35, 36; 180/65.1–65.3, 290; 903/903, 903/940–946; 477/3, 7, 107; 318/53, 700, 318/712, 717, 798, 811
See application file for complete search history.

(56) References Cited

U.S. PATENT DOCUMENTS

| 4,352,152 | A |   | 9/1982  | Smith              |
|-----------|---|---|---------|--------------------|
| 5,495,906 | A | * | 3/1996  | Furutani ..................... 180/65.2 |
| 5,820,172 | A | * | 10/1998 | Brigham et al. ........... 290/40 C |
| 6,242,873 | B1| * | 6/2001  | Drozdz et al. ............... 318/139 |
| 6,724,172 | B2| * | 4/2004  | Koo ........................... 320/128 |
| 6,745,117 | B1|   | 6/2004  | Thacher et al. ............... 701/50 |
| 6,801,020 | B2| * | 10/2004 | Blackburn .................... 322/25 |
| 6,965,826 | B2|   | 11/2005 | Andres et al. ............... 701/115 |
| 7,069,673 | B2| * | 7/2006  | Kagoshima et al. .......... 37/348 |
| 2004/0148817 | A1 | * | 8/2004 | Kagoshima et al. .......... 37/348 |
| 2004/0164616 | A1 | * | 8/2004 | Obayashi et al. ............. 307/18 |
| 2005/0139399 | A1 |   | 6/2005 | Gopal |
| 2006/0166783 | A1 |   | 7/2006 | Tamai et al. |
| 2006/0240940 | A1 | * | 10/2006 | Saito ............................. 477/3 |

OTHER PUBLICATIONS

Wiegman, Herman, L.N.; Vendenput, A.J.A *Battery State Control Techniques for Charge Sustaining Applications*, Society of Automotive Engineers, Inc., SAE Paper # 981129, 1998.

* cited by examiner

*Primary Examiner*—Jack W. Keith
*Assistant Examiner*—Chuong P Nguyen

(57) ABSTRACT

A method and system for adaptively controlling a hybrid vehicle comprises a recorder for recording a historical load or duty cycle of vehicle during or after operation of the vehicle. A classifier classifies the historical load in accordance with a load category. A controller assigns at least one of a current control curve and a slew rate control curve associated with the load category for a defined time period after the recording of the historical load or if the vehicle is presently operating generally consistent with the load category. At least one of the current control curve and the slew rate control curve, or data representative thereof, are used to control an operation of an electric drive motor of the vehicle for the defined time period.

7 Claims, 7 Drawing Sheets

| Load Category | Current Control Curve (in Fig. 6) | Slew Rate Control Curve (in Fig. 7) |
|---|---|---|
| Steady High Duty | B | I |
| High Duty With Marked Acceleration and Cruising | B | F |
| Transient High Duty | E | J |
| Steady Low Duty | D | I |
| Low Duty With Marked Acceleration and Cruising | D | F |
| Transient Low Duty | C | F |
| Default, General Purpose or Baseline | A | F |

Fig. 8

METHOD AND SYSTEM FOR ADAPTIVELY CONTROLLING A HYBRID VEHICLE

FIELD OF THE INVENTION

The present invention relates to a method and system for adaptively controlling a hybrid vehicle.

BACKGROUND OF THE INVENTION

A hybrid vehicle may have a control scheme that does not consider the use or load conditions of a vehicle. If the hybrid vehicle is operated under light load conditions, an internal combustion engine of the hybrid vehicle may burn more fuel than is necessary to handle adequately the light load. Conversely, if the hybrid vehicle is operated under heavy load conditions, the hybrid vehicle performance may be deficient where too much reliance is placed on the electric drive. Accordingly, there is a need to tune the control scheme of the hybrid vehicle to meet the applicable or anticipated load conditions.

SUMMARY OF THE INVENTION

A method and system for adaptively controlling a hybrid vehicle comprises a recorder for recording a historical load or duty cycle of vehicle during or after operation of the vehicle. A classifier classifies the historical load in accordance with a load category. A controller assigns at least one of a current control curve and a slew rate control curve associated with the load category for a defined time period (e.g., session) after the recording of the historical load or if the vehicle is presently operating generally consistent with the load category. At least one of the current control curve and the slew rate control curve, or data representative thereof, are used to regulate the electrical energy provided to an electric drive motor of the vehicle for the defined time.

BRIEF DESCRIPTION OF THE DRAWINGS

FIG. 8 is a chart that illustrates selection of current control curves and slew rate control curves for corresponding classifications of load categories.

DESCRIPTION OF THE PREFERRED EMBODIMENT

Figure 1:
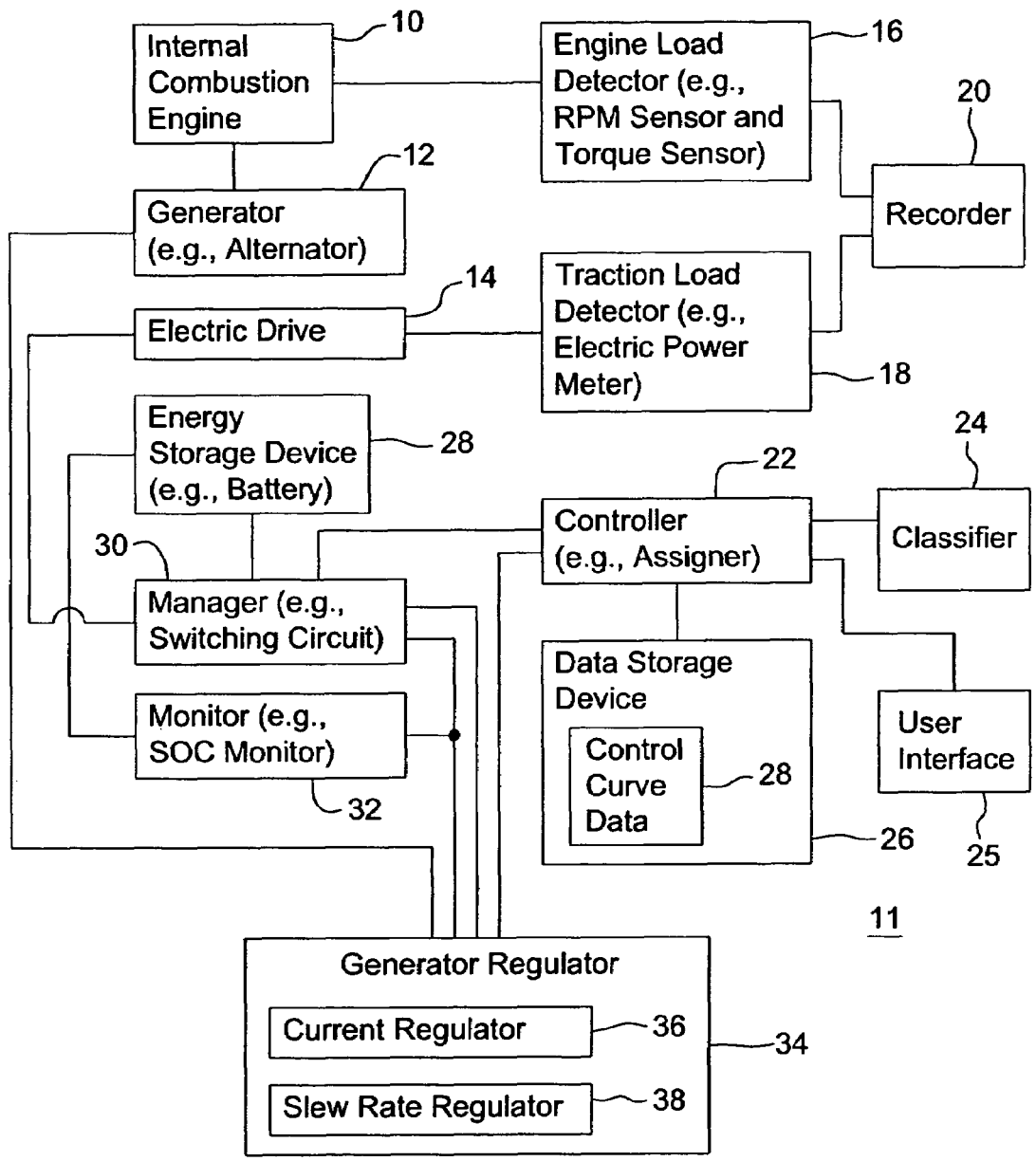
FIG. 1 is a block diagram of one embodiment of a system for adaptively controlling a hybrid vehicle.

In accordance with one embodiment, FIG. 1 shows a control system 11 for adaptively controlling a hybrid vehicle (e.g., a series hybrid configuration). A hybrid vehicle comprises an internal combustion engine 10 and at least one electric drive 14. A generator 12 (e.g., alternator) may convert mechanical energy of the internal combustion engine 10 into electrical energy for driving the electric drive 14, charging an energy storage device 28 (e.g. a battery), or both. A monitor 32 (e.g., state-of-charge monitor) is associated with the energy storage device 28 for measuring a state of charge or state of the energy storage device 28. For example, the monitor 32 measures an available capacity of the energy storage device 28 or battery as a percentage or ratio of a total capacity of the energy storage device 28 (e.g., when the battery is new and fully charged).

In one embodiment, an engine load detector 16 is associated with the internal combustion engine 10 and a traction load detector 18 is associated with the electric drive 14. The engine load detector 16 may sense or detect a load (e.g., duty level and duty cycle) of the internal combustion engine 10 associated with operation of the vehicle for one or more recent time intervals (e.g., sessions or defined time periods). The traction load detector 18 may sense or detect a load (e.g., duty level and duty cycle) of the electric drive 14 associated with operation of the vehicle for one or more recent time intervals (e.g., sessions or defined time periods).

A classifier may classify a historical load, a present load or any other detected load in accordance with a load category. The historical load may define a recent operational vehicle history or be limited to a recent time period or recent session. Each load category may be associated with one or more of the following parameters: a duty level, a duty cycle, and a usage factor. A duty level may be characterized in terms of any of the following: duty level factors, peak, mean, or mode horsepower or horsepower rating; peak, mean or mode power consumption; peak, mean, or mode current consumption; root-mean-squared (RMS) current consumption; current draw, peak, mean or mode revolutions per minute and corresponding peak, mean, or mode torque output associated with the internal combustion engine 10, the electric drive 14, or both. The duty level may be described in accordance with two or more levels (e.g., high duty and low duty) by dividing or quantizing the detected load data into discrete sets. A duty cycle may be characterized as the frequency, duration or one or more time samples in which the internal combustion engine 10, the electric drive 14, or both are active at a particular duty level or the percentage or ratio of time in which the internal combustion engine 10, the electric drive 14, or both are active at a particular duty level with respect to total time of vehicle activity. For example, the duty cycle may be characterized as intermittent (or transient) or continuous (or steady). A threshold percentage of use may be defined for continuous operation (e.g., seventy percent or greater or another suitable value).

A user interface 25 is coupled to the controller 22. The user interface 25 may comprise a keyboard, a keypad, a pointing device (e.g., electric mouse), an ignition switch, an ignition switch associated with a timer, an ignition switch associated with a clock or time and date stamping module, or voice recognition module. In one embodiment, the user interface 25 supports the user's entry or selection of a usage factor for processing by the control system (11 or 111). The usage factor may provide information on one or more of the following: (1) planned or possible user tasks for a session or vehicle characteristic, (2) desired maximum acceleration level for a session or vehicle characteristic, and (3) desired maximum cruising speed or maximum velocity for a user session or vehicle characteristic. Possible tasks may include agricultural tasks, construction tasks, forestry tasks, lawn and garden tasks, military tasks, mowing tasks, utility vehicle tasks, performance tasks, or otherwise. For agricultural tasks, spraying with a light payload of crop input materials (e.g., pesticide) may be regarded as a low duty level, whereas cultivating may be regarded as a high duty level task, for example.

A controller 22 controls the generator regulator 34 and the manager 30 to regulate a generator output of the generator. The controller 22 assigns one or more responses for the generator regulator 34 to apply to the generator output based on the detected load (e.g., duty level and duty cycle). The controller 22 may comprise an assigner that assigns one or more current control curves and one or more slew rate control curves. The current control curves and slew rate control curves may be referred to collectively as control curve data 28. The controller 22 may access, store, or retrieve control curve data 28 associated with the data storage device 26.

In general, the slew rate means the rate of change or instantaneous change in current (or voltage) and may be measured as the magnitude of the change in current (or voltage) per unit time. The slew rate may measure the response time of the generator output voltage or amperage, from a minimum magnitude level (e.g., 10 percent of maximum current output) to a maximum magnitude level (e.g., 90 percent of maximum current output). For example, upon starting up of the generator 12, the generator current may ramp up from a rest current level to an operational current level range (e.g., full output) over the response time.

The controller 22 is coupled to a manager 30 and a generator regulator 34 The manager 30 (e.g., switching circuit) and the generator regulator 34 implement or execute the control curves 28 (e.g., current control curve and slew rate control curve) that are assigned by the controller 22. The manager 30 determines whether the energy storage device 28 provides electrical energy to the electric drive 14, whether the generator 12 provides electrical energy to the electric drive 14, or whether both provide electrical energy, consistent with the assigned control curve or assigned load category. The manager 30 may comprise a switching circuit to selectively interconnect the generator output of the generator 12 to the energy storage device 26 or the electric drive 14, or both.

The generator regulator 34 is coupled into the signal path between the generator output and the manager 30. The generator regulator 34 may comprise a current regulator 36, a slew rate regulator 38, or both for regulating the generator output signal consistent with the control curve data 28 (e.g., a current control curve, and a slew rate control curve). The generator regulator 34 provides current regulation and slew rate regulation consistent with the assigned current control curve or assigned slew rate control curve consistent with the applicable load category. For example, the generator regulator 34 may vary the maximum current from the generator 12 and the generator slew rate with the energy level or state of charge of energy stored within the energy storage device 28 consistent with the control curve data 28.

The generator regulator 34 is associated with control curve data 28, which may be expressed in any format including one or more of the following: curve equations, quadratic equations, linear equations, database, look-up tables, tabular data, and other suitable data structures. The control curve data 28 may represent one or more control curves, slew rate control curves, control curve data, slew rate curve data or otherwise, where the shape of the curves or content of the corresponding data may be optimized or tailored to meet the detected historical load category, the present load category, or both. The load category may vary with different vehicle environments (e.g., hilly terrain), operations, or tasks. The tasks may include agricultural tasks, construction tasks, lawn and garden tasks, forestry/lumber production tasks, or any other tasks. In one embodiment, the load categories may be characterized as one or more of the following: high-duty, steady high-duty, high duty with marked acceleration and cruising, transient high duty, low duty, transient low duty, and steady low duty. The marked acceleration may be defined as meeting or exceeding a minimum acceleration requirement. The cruising or marked cruising may be defined as meeting or exceeding a minimum velocity or a velocity and distance requirement. The controller 22 selects of the control curve and slew rate curve (or corresponding control curve data 28 representative thereof for the generator regulator 34 that is aligned with the applicable load category. The proper selection of the current control curve and slew rate curve has the capacity to influence vehicle performance in terms of battery longevity, generator response, hauling capabilities, fuel consumption, and vehicle acceleration.

Figure 2:
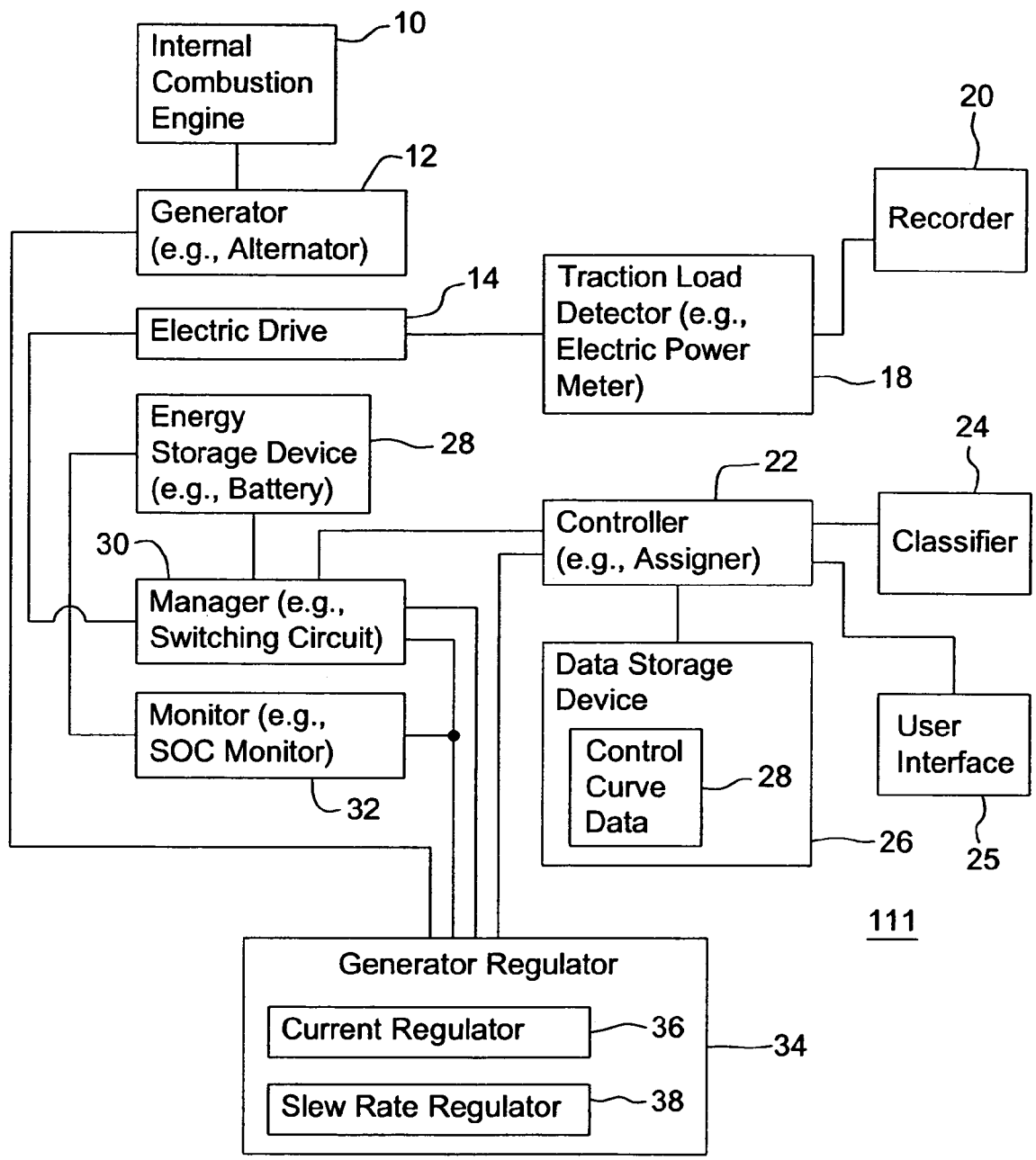
FIG. 2 is a block diagram of another embodiment of a system for adaptively controlling a hybrid vehicle.

The system 111 of FIG. 2 is similar to the system 11 of FIG. 1, except the system 111 of FIG. 2 deletes the engine load detector 16. Like reference numbers in FIG. 1 and FIG. 2 indicate like elements. In the system 111 of FIG. 2, the internal combustion engine 10 merely provides rotational or mechanical energy to the generator 12 (e.g., alternator), as opposed to providing mechanical energy directly or indirectly (through a transmission or transaxle) to a drive wheel. Accordingly, the traction load detector 18 provides information on the load of the electric drive 14, which can be used to derive or estimate the engine load data on the internal combustion engine 10 without the necessity of the engine load detector 16.

Figure 3:
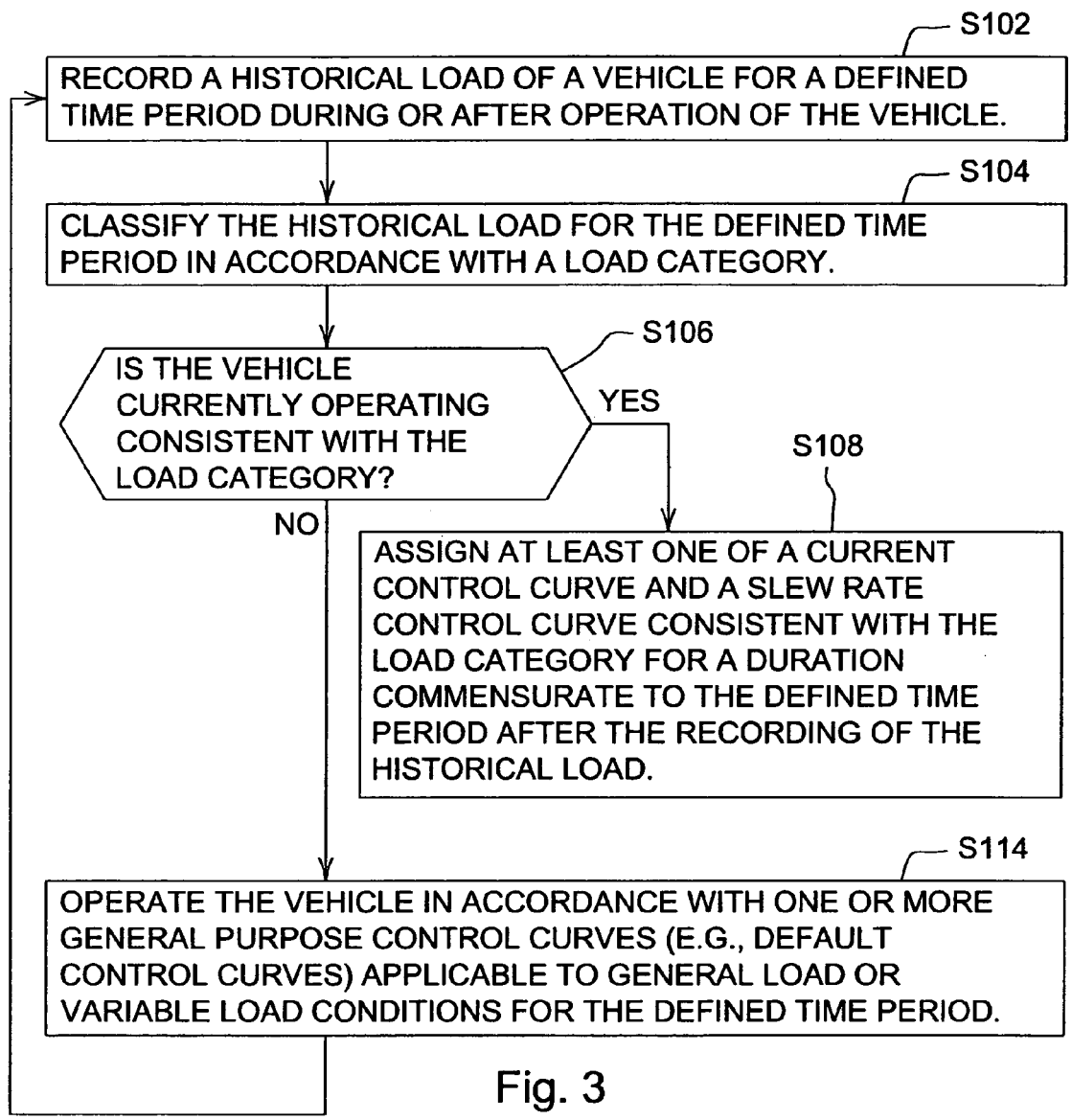
FIG. 3 is flow chart of one embodiment of a method for adaptively controlling a hybrid vehicle.

FIG. 3 is a method for adaptively controlling a hybrid vehicle. The method of FIG. 3 begins in step S102.

In step S102, a recorder 20 records a historical load or duty cycle of a vehicle for a defined time period during or after operation of the vehicle. For example, the recorder 20 may record or store output data or output signals from an engine load detector 16, a traction load detector 18, or both. The engine load detector 16 is associated with an internal combustion engine 10, whereas the traction load detector 18 is associated with an electric drive 14 or another electric motor. The historical load and/or present load may be measured in terms of revolutions per unit time (e.g., revolutions per minute (RPM)) of a shaft for an internal combustion engine 10 associated with the vehicle and a torque measurement (e.g., load measurement) of a torque sensor associated with the shaft, or otherwise. For a vehicle associated with an electric drive 14, the traction load detector 18 may measure the historical load and/or present load by one or more of the following: current draw of the traction drive, electrical power consumption of the traction drive, torque measurements of the traction drive, and revolutions per unit time measurement for an electric drive 14.

In step S104, a classifier 24 classifies the historical load for the defined time period in accordance with a load category (e.g., a historical load category). For example, the load categories may include the following classifications of the vehicle operations: steady high duty, high duty with marked acceleration and cruising, transient or intermittent high duty, steady low duty, low duty with marked acceleration and cruising, and transient or intermittent low duty. As used herein, load category shall apply to a historical load category, a present load category, or both as the context requires.

In step S106, a controller 22 or data processor determines if a vehicle, its implements, or both are currently operating consistent with the classified load category (e.g., historical load category) based on output data or output signals from at least one of the engine load detector and the traction load detector. In one embodiment, the classifier 24 first classifies a present load in accordance with a present load category; the controller 22 compares the present load category to the historical load category to determine if they are consistent or match. For example, the classifier 24 may classify both the present load and the historical load in accordance with at least one of a duty level, a duty cycle, and a usage factor, or codes, symbols or other identifiers representative thereof. If the vehicle, its implements, or both are currently operating with a present load category consistent with the classified historical load category, then the method continues with step S108. However, if the vehicle, its implements, or both are currently not operating consistent with the classified load category (e.g., historical load category) or fall outside of the scope of the classified load category, the method continues with step S114.

Figure 6:
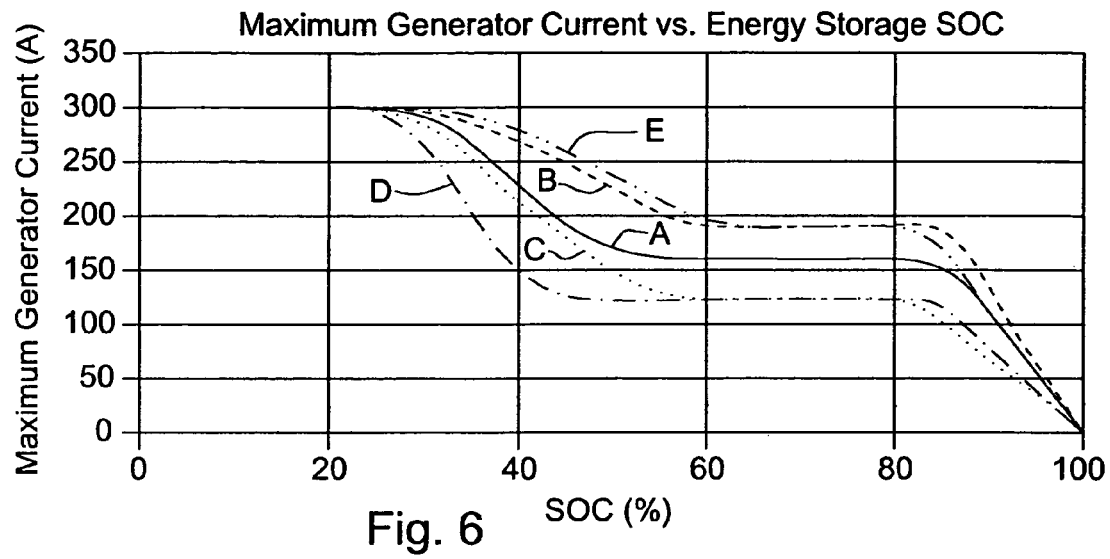
FIG. 6 is chart of illustrative current control curves of maximum generator current versus a state of charge of an energy storage device.
Figure 7:
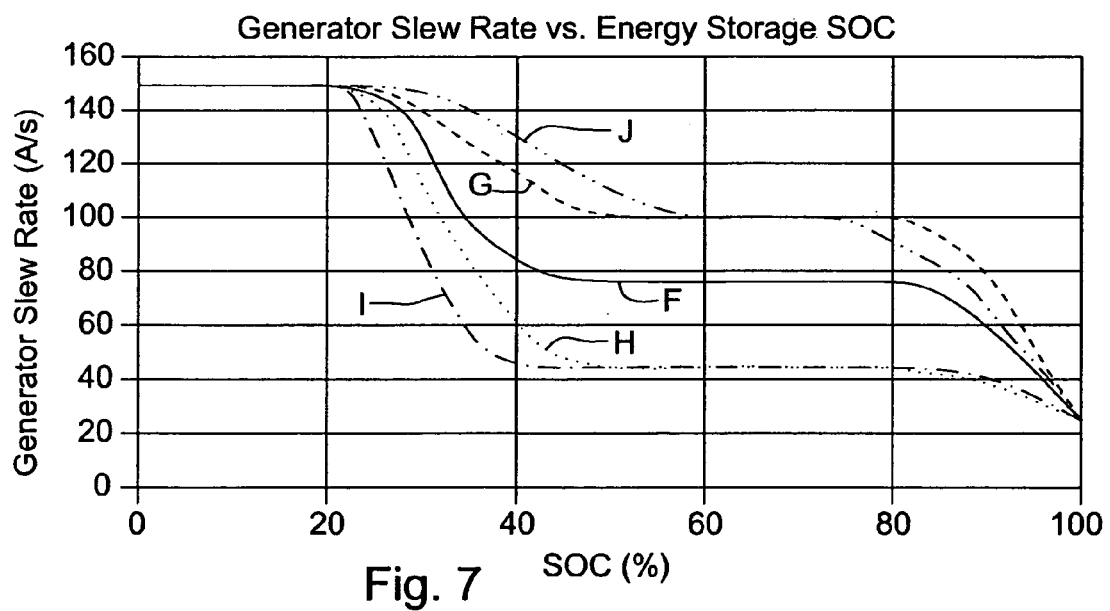
FIG. 7 is a chart of illustrative slew rate control curves of generator slew rate versus a state of charge for an energy storage device.

In step S108, the controller 22 or assigner assigns at least one of a current control curve and a slew rate control curve consistent with the classified load category for a defined time period after the recording or detecting of the historical load of step S102. The current control curve may be expressed in terms of maximum generator current versus state of charge of an energy storage device of the vehicle and the slew rate control curve may be expressed in terms of generator slew rate versus state of charge of an energy storage device of the vehicle. Each classified load category may be associated with a corresponding current control curve, a slew rate control curve, or both. FIG. 6 provides illustrative examples of current control curves. FIG. 7 provides illustrative examples of slew rate control curves. FIG. 8 illustrates various load categories associated with corresponding current control curves and corresponding slew rate control curves.

In one example of carrying out step S108, the controller 22 or assigner assigns the control curve and slew rate curve that corresponds to the load category in accordance with the chart or look-up table of FIG. 8. The controller 22 may assign the current control curve based on a first look-up table entry associated with the classified load category and may assign the slew rate control curve based on look-up table entry associated with the classified load category. The chart of FIG. 8 may be expressed as a database or another data structure and still fall within the scope of step S108 and the invention.

In step S114, the controller 22 or data processor operates the vehicle in accordance with one or more general purpose control curves (e.g., a default control curve) applicable to a general load or variable load conditions for a defined time period. In practice, the general control curve may depend upon the type of vehicle, a horsepower of the vehicle, a configuration of the vehicle, or a work task (e.g., plowing, harvested, planting, spraying). The general purpose control curve may be characterized by an intermediate level of maximum generator current (particularly in any generally constant region of current versus state of charge of the energy storage device) in comparison to other current control curves. Similarly, the general purpose slew rate control curve may be characterized by an intermediate level of maximum slew rate (particularly in any generally constant region of slew rate versus stage of charge of the energy storage device). For example, in one embodiment, the general purpose curves may represent current control curve A of FIG. 6 and slew rate control curve F of FIG. 7.

Figure 4:
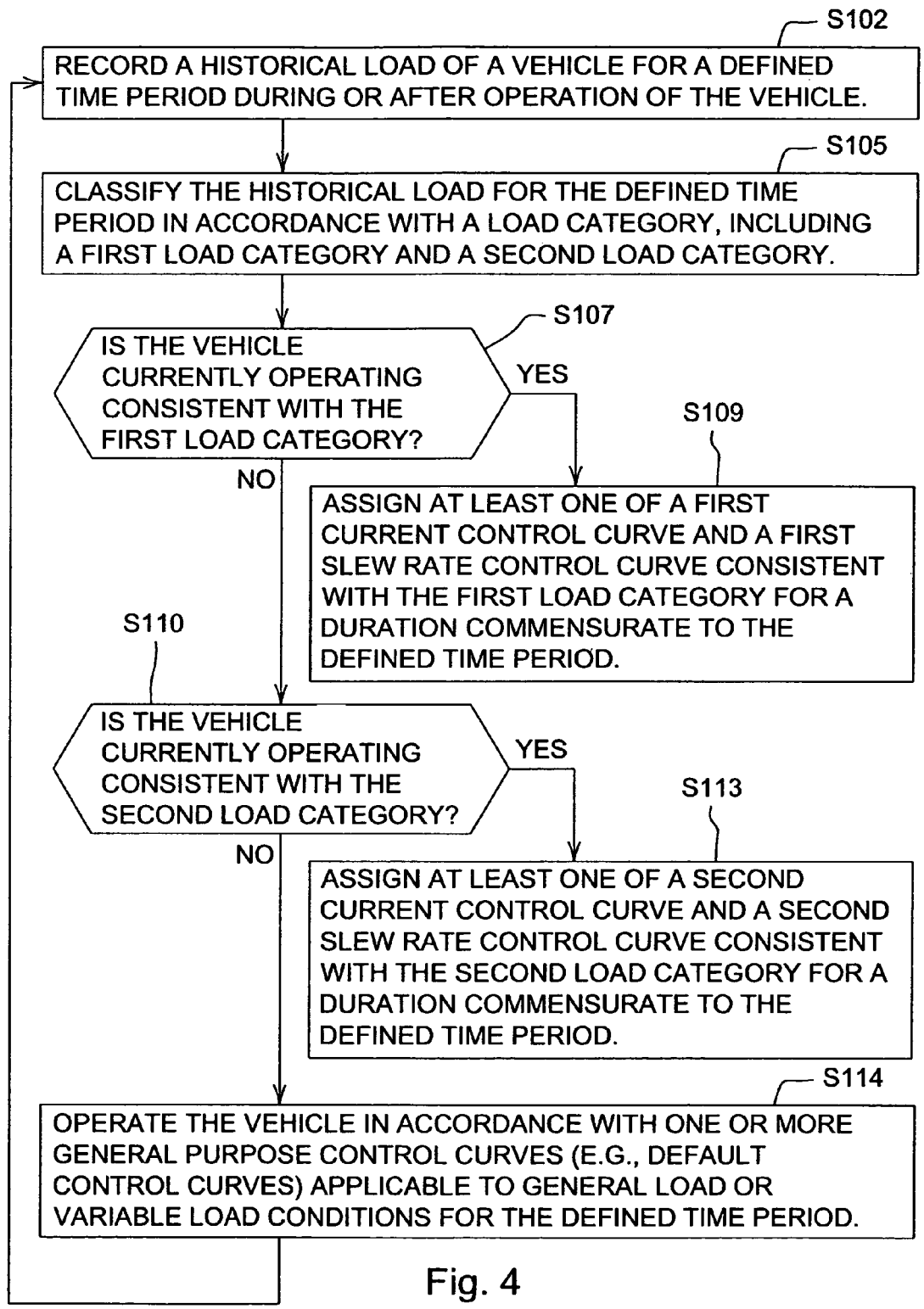
FIG. 4 is flow chart of another embodiment of a method for adaptively controlling a hybrid vehicle.

FIG. 4 is a method for adaptively controlling a hybrid vehicle. The method of FIG. 4 begins in step S102. Like reference numbers in FIG. 3 and FIG. 4 indicate like elements.

In step S102, a recorder 20 records a historical load for a defined time period of a vehicle during or after operation of the vehicle. For example, the recorder 20 may record or store output data or output signals from an engine load detector 16, a traction load detector 18, or both. The engine load detector 16 is associated with an internal combustion engine 10, whereas the traction load detector 18 is associated with an electric drive 14 or another electric motor. The historical load or present load may be measured in terms of revolutions per unit time of a shaft for an internal combustion engine associated with the vehicle and a torque measurement (e.g., load measurement) of a torque sensor associated with the shaft, or otherwise. For a vehicle associated with a traction drive, the traction load detector 18 may measure the historical load or present load by one or more of the following: current draw of the traction drive, electrical power consumption of the traction drive, torque measurements of the traction drive, and revolutions per unit time for a traction drive.

In step S105, a classifier 24 classifies the historical load in accordance with a load category, including a first load category and a second load category. For example, the first load category may be defined as any of the following classifications of the vehicle operations: steady high duty, high duty with marked acceleration and cruising, transient or intermittent high duty, steady low duty, low duty with marked acceleration and cruising, and transient or intermittent low duty. Similarly, the second load category may defined as any of the foregoing classifications, which is distinct from the first load category. Other load categories based on duty level, duty cycle, and usage data other than those set forth in this paragraph are possible and fall within the scope of the invention.

In step S106, a controller 22 or classifier 24 determines if a vehicle, its implements, or both are currently operating consistent with the first load category based on output data or output signals from at least one of the engine load detector 16 and the traction load detector 18. In one embodiment, the classifier 24 first classifies a present load in accordance with a load category; the controller 22 compares the present load category to the first load category to determine if they are consistent or match. For example, the classifier 24 may classify both the present load and the historical load in accordance with at least one of a duty level, a duty cycle, and a usage factor, or codes, symbols or other identifiers representative thereof. For example, the first load category may be defined as any load category set forth in FIG. 8. Although the load categories of FIG. 8 include the following classifications of the vehicle operations: steady high duty, high duty with marked acceleration and cruising, transient or intermittent high duty, steady low duty, low duty with marked acceleration and cruising, and transient or intermittent low duty; other load categories are possible and fall within the scope of various embodiments of the invention. If the vehicle, its implements, or both are currently operating consistent with a first load category, then the method continues with step S109. However, if the vehicle, its implements, or both are currently not operating consistent with the first load category or fall outside of the scope of the first load category, the method continues with step S110.

In step S109, the controller 22 or assigner assigns at least one of a first current control curve and a first slew rate control curve consistent with the first load category for the defined time period. The first current control curve may be expressed in terms of maximum generator current versus state of charge of an energy storage device of the vehicle. The first slew rate control curve may be expressed in terms of generator slew rate versus state of charge of an energy storage device of the vehicle. The first load category may be associated with a corresponding first current control curve, a first slew rate control curve, or both. FIG. 6 provides illustrative examples of current control curves (e.g., first current control curves). FIG. 7 provides illustrative examples of slew rate control curves (e.g., first slew rate control curves). FIG. 8 illustrates various load categories, corresponding current control curves, and corresponding slew rate control curves.

In one example of carrying out step S109, the controller 22 or assigner assigns the first control curve and first slew rate curve that corresponds to the first load category in accordance with the chart or look-up table of FIG. 8. The controller 22 may assign the first current control curve based on a first look-up table entry associated with the first load category and may assign the first slew rate control curve based on second look-up table entry associated with the first load category. The chart of FIG. 8 may be expressed as a database or another data structure and still fall within the scope of step S108 and the invention.

Step S109 may be carried out in accordance with various techniques, which may be applied alternately or cumulatively. Under a first technique, if the first current control curve is associated with a low duty load category, the first current control curve (e.g., curve D or C of FIG. 6) may comprise generally lower maximum generator currents than a reference control curve (e.g., curve A of FIG. 6). associated with a general purpose load category. Under a second technique, if the first current control curve is associated with a low duty load category, the first current control curve (e.g., curve D or C of FIG. 6) comprises an intermediate curve region of generally constant current over a wider state of charge range than that of the reference control curve (e.g., curve A of FIG. 6). Under a third technique, if the first current control curve is associated with a heavy or high duty load category, the first current control curve (e.g., curve B or E of FIG. 6) may comprise generally higher maximum generator currents than a reference control curve (e.g., curve A of FIG. 6). associated with a general purpose load category. Under a fourth technique, if the first current control curve is associated with a heavy or high duty load category, the first control curve (e.g., curve B or E of FIG. 6) comprises an intermediate curve region of generally constant current over a narrower state of charge range than that of the reference control curve (e.g., curve A of FIG. 6).

In step S110, a controller 22 or classifier 24 determines if a vehicle, its implements, or both are currently operating consistent with the second load category. In one embodiment, the classifier 24 first classifies a present load in accordance with a load category; the controller 22 compares the present load category to the second load category to determine if they are consistent or match. For example, the classifier 24 may classify both the present load and the historical load in accordance with at least one of a duty level, a duty cycle, and a usage factor, or codes, symbols or other identifiers representative thereof. If the vehicle, its implements, or both are currently operating consistent with a second load category, then the method continues with step S113. However, if the vehicle, its implements, or both are currently not operating consistent with the second load category or fall outside of the scope of the second load category, the method continues with step S114.

In step S110, the second load category may represent any load category set forth in FIG. 8 that is distinct from the first load category defined in step S106. In one embodiment, the second load category comprises one of the following operational classifications of the vehicle distinct from the first load category: steady high duty, high duty with marked acceleration and cruising, transient high duty, steady low duty, low duty with marked acceleration and cruising, transient low duty, and default or general purpose.

In step S113, the controller 22 or assigner assigns at least one of a second current control curve and a second slew rate control curve consistent with the second load category for the defined time period. The second load category may be associated with a corresponding second current control curve, a second slew rate control curve, or both. The second current control curve may be expressed in terms of maximum generator current versus state of charge of an energy storage device 28 of the vehicle. The second slew rate control curve may be expressed in terms of generator slew rate versus state of charge of an energy storage device 28 of the vehicle.

Step S113 may be carried out in accordance with various techniques, which may be applied alternately or cumulatively. Under a first technique, if the first slew rate control curve is associated with a low duty load category, the first slew rate control curve (e.g., curve I or F of FIG. 6) may comprise maximum slew rates that are less than or equal to those of a reference control curve (e.g., curve F of FIG. 6). associated with a general purpose load category. Under a second technique, if the first slew rate control curve is associated with a low duty load category, the width of the generally constant slew rate region of the first slew rate control curve (e.g., curve I or F of FIG. 6) may be equal to or greater than that of reference slew rate control curve (e.g., curve F of FIG. 6).

In step S114, the controller 22 or data processor operates the vehicle in accordance with one or more general purpose control curves (e.g., a default control curve) applicable to a general load or variable load conditions for a defined time period. In practice, the general control curve may depend upon the type of vehicle, a horsepower of the vehicle, a configuration of the vehicle, or a work task (e.g., plowing, harvested, planting, spraying).

Figure 5:
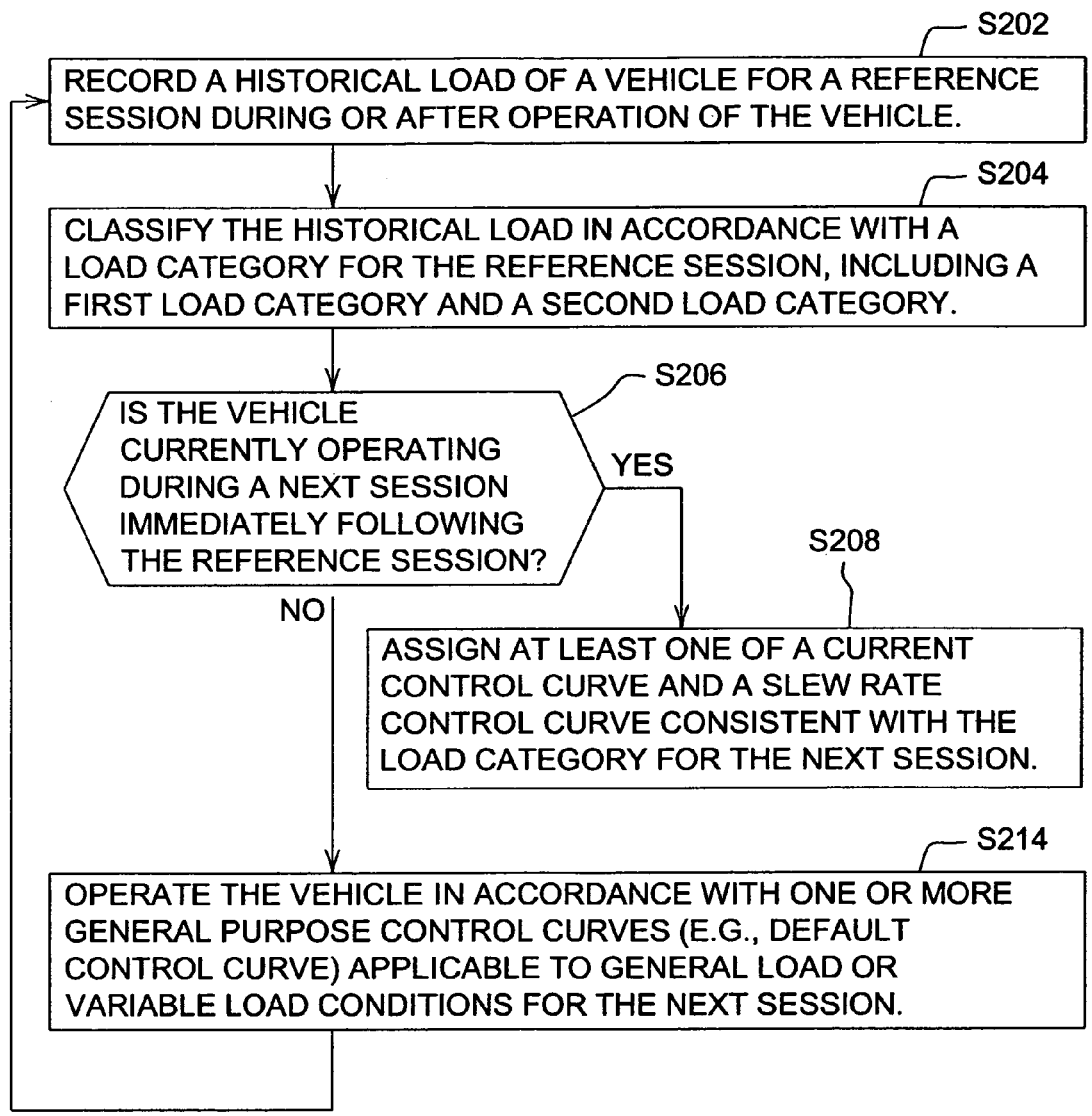
FIG. 5 is a flow chart of yet another embodiment of a method for adaptively controlling a hybrid vehicle.

FIG. 5 is a method for adaptively controlling a hybrid vehicle. The method of FIG. 5 begins in step S202.

In step S202, a recorder 20 records a historical load of a vehicle for a reference session during or after operation of the vehicle. A session refers to the time period or term during which a vehicle is active or is engaging toward completion of a task. A reference section refers to any session during which the historical load is measured. In one exemplary configuration, the reference session may be regarded as a period between turning on an ignition switch and turning off the ignition switch of the vehicle. In another exemplary configuration via the user interface 25, the user may enter a session identifier, a session duration, a task associated with a session, or any other session-related information to facilitate the definition of reference session or another session (e.g., next session).

In one example of carrying out step S202, the recorder 20 may record or store output data or output signals from an engine load detector 16, a traction load detector 18, or both. The engine load detector 16 is associated with an internal combustion engine 10, whereas the traction load detector 18 is associated with an electric drive 14 or another electric motor. The historical load and/or present load may be measured in terms of revolutions per unit time (e.g., revolutions per minute (RPM)) of a shaft for an internal combustion engine 10 associated with the vehicle and a torque measurement (e.g., load measurement) of a torque sensor associated with the shaft, or otherwise. For a vehicle associated with an electric drive 14, the traction load detector 18 may measure the historical load and/or present load by one or more of the following: current draw of the traction drive, electrical power consumption of the traction drive, torque measurements of the traction drive, and revolutions per unit time measurement for an electric drive 14.

In step S204, a classifier 24 classifies the historical load for the reference session in accordance with a load category. In general, the classifier 24 may classify the historical load in accordance with at least one of duty level, a duty cycle, and a usage factor. For example, the load categories may include the following classifications of the vehicle operations: steady high duty, high duty with marked acceleration and cruising, transient or intermittent high duty, steady low duty, low duty with marked acceleration and cruising, and transient or intermittent low duty.

In step S206, a controller 22 or data processor determines if a vehicle is operating in a next session immediately following the reference session. The controller 22 may look at operational time stamps, operational durations, or both associated with the reference session and the next session to determine if the vehicle is indeed operating in the next session. In one embodiment, if a time gap between the reference session and the next session exceeds a maximum threshold, the controller 22 may determine that the vehicle is not currently operating in the next session. If the vehicle is currently operating in the next session immediately following the reference session, then the method continues with step S208. However, if the vehicle is currently not operating in the next session, the method continues with step S214.

In an alternate embodiment of step S206, the controller 22 may determine if a vehicle is operating in the next session and if a present load (e.g., present load category) of the vehicle is consistent with or matches the historical load (e.g., historical load category) of the vehicle. Accordingly, in such an alternate embodiment, if a vehicle is operating in the next session and if a present load of the vehicle is consistent with or matches the historical load of the vehicle, the method continues with step S208, but otherwise continues with step S214.

In step S208, the controller 22 or assigner assigns at least one of a current control curve and a slew rate control curve consistent with the classified load category for the next session after the recording or detecting of the historical load of step S202. In one configuration, the controller 22 assigns a current control curve (e.g., a first current control curve) with a maximum current based on the load category (e.g., first load category) and a range of state of charge of the energy storage device associated with a generally constant current. In another configuration the controller 22 assigns a slew rate control curve (e.g., first slew rate control curve) with a maximum slew rate based on the load category (e.g., first load category) and a range of state of charge of energy storage device associated with a generally constant slew rate.

The current control curve may be expressed in terms of maximum generator current versus state of charge of an energy storage device of the vehicle and the slew rate control curve may be expressed in terms of generator slew rate versus state of charge of an energy storage device of the vehicle. Each classified load category may be associated with a corresponding current control curve, a slew rate control curve, or both. FIG. 6 provides illustrative examples of current control curves. FIG. 7 provides illustrative examples of slew rate control curves. FIG. 8 illustrates various load categories associated with corresponding current control curves and corresponding slew rate control curves.

In one example of carrying out step S208, the controller 22 or assigner assigns the control curve and slew rate curve that corresponds to the load category in accordance with the chart or look-up table of FIG. 8. The controller 22 may assign the current control curve based on a first look-up table entry associated with the classified load category and may assign the slew rate control curve based on look-up table entry associated with the classified load category. The chart of FIG. 8 may be expressed as a database or another data structure and still fall within the scope of step S208 and the invention.

In step S214, the controller 22 or data processor operates the vehicle in accordance with one or more general purpose control curves (e.g., a default control curve) applicable to a general load or variable load conditions for the next session. In practice, the general control curve may depend upon the type of vehicle, a horsepower of the vehicle, a configuration of the vehicle, or a work task (e.g., plowing, harvested, planting, spraying). The general purpose control curve may be characterized by an intermediate level of maximum generator current (particularly in any generally constant region of current versus state of charge of the energy storage device) in comparison to other current control curves. Similarly, the general purpose slew rate control curve may be characterized by an intermediate level of maximum slew rate (particularly in any generally constant region of slew rate versus stage of charge of the energy storage device). For example, in one embodiment, the general purpose curves may represent current control curve A of FIG. 6 and slew rate control curve F of FIG. 7.

FIG. 6 is a chart that illustrates the state of charge of energy storage device 28 versus maximum generator current. The horizontal axis of FIG. 6 represents the state of charge of the energy storage device 28 (e.g., battery) as a percentage. One hundred percent represents a fully charged energy storage device 28, whereas 0 percent represents a fully discharged energy storage device. The vertical axis of FIG. 6 represents the maximum generator current (e.g., in amperes).

A set of current control curves is illustrated in FIG. 6. The set of current control curves includes one or more of the following: a general purpose (e.g., default) current control curve A, a high current control curve B, a low current control curve C, a low and wide current control curve D, and a high and narrow current control curve E. The general purpose current control curve A is shown as a solid line; the high current control curve B is shown as a dashed line; the low current control curve C is shown as a dotted line; the low and wide current control curve D is shown as an alternating dot-dash line; and the high and narrow current control curve E current control curve is shown as a dot-dot-dash line. The set of current control curves limits the steady-state response to changes in vehicle requirements.

In general, the shape of the set of current control curves of FIG. 6 reflects a high charging current for a corresponding low state of charge (SOC) of the energy storage device 28 because the generator 12 is needed to provide current to both the electric drive 14 and the energy storage device (e.g., for charging the battery).

The shape of the set of current control curves levels off or provides a constant charging current for an intermediate range within the state of charge spectrum because the energy storage device 28 (e.g., battery) may be capable of both relatively high charging and discharging currents. The intermediate range may be characterized by the width or scope of the intermediate range and its average charging value or generally constant charging value. As the scope of the intermediate range is increased, more of the capacity of the energy storage device 28 is used or available by the hybrid vehicle. The scope or width of the intermediate range may be determined based on one or more of the following: the depth of discharge, fuel savings, and maximum charging current and discharging current. As the scope of the intermediate range is decreased, less capacity of the energy storage device is being used in the hybrid scheme. The major trade-offs for determining the average value or constant charging current of the intermediate range or its width are audible engine oscillations of the internal combustion engine 10 and fuel savings.

The high current control curve B of FIG. 6 for generator current is generally well-suited for high duty operations or loads, partially because of the bandwidth of its intermediate range. The high curve B supports adequate acceleration and cruising for high duty operations or loads. The high and narrow current control curve E curve of FIG. 6 is well suited for transient high duty operations or loads. The low and wide curve of the generator 12 current is well suited for low duty operations or loads with marked acceleration and cruising. Marked acceleration may be defined objectively with respect to a minimum acceleration requirement for the vehicle over a time period or distance of travel. Marked cruising may be defined objectively with respect to a minimum velocity requirement for the vehicle over a time period or distance of travel. The low current control curve C is well suited for low duty operations or loads that are transient.

The data storage device 26 may store the set of control curves or data representative thereof (e.g., control curve data 28) in the data storage device 26. The first control curves may be represented as graphical data, tabular data, database entries, a collection of points (e.g., inflection points), or by control curve equations, quadratic equations, line equations, or otherwise. The historical load on the vehicle determines which of the first control curves is selected for a defined time interval (e.g., next session) following the historical time interval (e.g., reference session). The monitor 32 provides state of charge information for the energy storage device 28. The generator regulator 34 or current regulator 36 provides a charging current or maximum charging current consistent with the preferential one of the first control curves and the provided state of charge.

FIG. 7 is a chart that illustrates the state of charge of energy storage device 28 versus generator slew rate. The horizontal axis of FIG. 7 represents the state of charge of the energy storage device 28 (e.g., battery) as a percentage. One hundred percent represents a fully charged energy storage device 28, whereas 0 percent represents a fully discharged energy storage device 28. The vertical axis of FIG. 7 represents the maximum generator slew rate (e.g., in amperes per second).

A set of slew rate control curves is illustrated in FIG. 7. The set of slew rate control curves includes one or more of the following: a general purpose (e.g. default) slew rate control curve F, a high slew rate control curve G, a low slew rate control curve H, a low and wide slew rate control curve I, and a high and narrow slew rate control curve J. The general purpose slew rate control curve F is shown as a solid line; the high slew rate control curve G is shown as a dashed line; the low slew rate control curve H is shown as a dotted line; the low and wide slew rate control curve I is shown as an alternating dot-dash line; and the high and narrow slew rate control curve J is shown as a dot-dot-dash line.

The data storage device 26 may store the second slew rate control curves or data representative thereof in the data storage device 26. The second slew rate control curves may be represented as graphical data, tabular data, database entries, a collection of points (e.g., inflection points), or by slew rate control curve equations, linear equations, or otherwise. The historical load on the vehicle determines which of the slew rate control curves is selected for a defined time interval (e.g., next session) following the historical time interval (e.g., reference session). The monitor 32 provides state of charge information for the energy storage device 28. The generator regulator 34 or slew rate regulator 38 provides a charging current or change in charging current consistent with the preferential one of the slew rate control curves and the provided state of charge.

The low and wide slew rate curve I of FIG. 7 for generator slew rate is generally well-suited for steady high duty operations or loads. The high and narrow slew rate control curve of FIG. 7 for generator slew rate is well suited for transient high duty operations or loads. The general purpose slew rate curve F has moderate generator slew rate and a moderate intermediate range of the generator 12 current is well suited for low duty operations or loads with marked acceleration and cruising, for low duty operations or loads that are transient, and for high duty operations or loads with marked acceleration and cruising.

FIG. 8 is a chart that illustrates selection of generator control curves and slew rate control curves for corresponding load categories. The controller 22 may use a chart similar to that of FIG. 8 to select a preferential current control curve and a preferential slew rate control curve for a corresponding load category. Although the load categories of FIG. 8 may include the following classifications of the vehicle operations: steady high duty, high duty with marked acceleration and cruising, transient or intermittent high duty, steady low duty, low duty with marked acceleration and cruising, and transient or intermittent low duty; other load categories are possible and fall within the scope of various embodiments of the invention.

In one of the embodiments, the controller 22 may apply the chart of FIG. 8 or other data representative thereof as follows. If the classifier 24 classifies the historical load (e.g., reference session) as a generally continuous or steady high-duty operation, the controller 22 or assigner assigns a maximum generator current curve that is generally high and wide (e.g., generator 12 control curve B in FIG. 6), while the generator slew rate is generally low and wide (e.g., slew rate control curve I in FIG. 7). If the classifier 24 classifies the historical load (e.g., reference session) as a high-duty operation with marked acceleration and cruising, the classifier 24 or assigner assigns a maximum generator current curve that is generally high and wide (e.g., current control curve B in FIG. 6), while the generator slew rate curve (e.g., slew rate control curve F in FIG. 7) is generally moderate and narrow. If the classifier 24 classifies the historical load (e.g., reference session) as a transient, high-duty operation, the controller 22 or assigner assigns the maximum generator current curve (e.g., current control curve E in FIG. 6) that is generally high and narrow and the generator slew rate curve that is generally high and narrow (e.g., slew rate control curve J in FIG. 7). If the classifier 24 classifies the historical load (e.g., reference session) as steady, low-duty operations, the controller 22 or assigner assigns the maximum generator current curve that is generally low and a wide (e.g., generator 12 control curve D in FIG. 6) and the generator slew rate that is generally low and wide (e.g., slew rate control curve I in FIG. 7). If the classifier 24 classifies the historical load (e.g., reference session) as a low-duty operation with marked acceleration and cruising, the assigner or controller 22 assigns a maximum generator current curve that is generally low and wide (e.g., current control curve D in FIG. 6), while the generator slew rate curve is generally moderate and narrow (e.g., slew rate control curve F in FIG. 7). If the classifier 24 classifies the historical load (e.g., reference session) as a intermittent or transient, low-duty operation, the assigner or controller 22 assigns a maximum generator 12 current curve that is low and narrow (e.g., current control curve C in FIG. 6), while the generator slew rate curve is moderate and narrow (e.g., slew rate control curve F in FIG. 7).

The selection and application of the preferential current control curve and/or slew rate control curve may increase battery longevity, reduce fuel consumption (e.g., hydrogen, ethanol, or gasoline consumption), improve hauling capabilities, improve vehicle torque, or improve vehicle acceleration. In one embodiment, the first control curve, the second control curve, or both may be changed dynamically and adaptively based on the recent vehicle history. The controller 22 and generator regulator 34 tune hybrid vehicle performance of the vehicle by selection and application of the preferential first control curve, and the second control curve, and revising of such selection and application based on the most recent vehicle history. Accordingly, the hybrid vehicle performance is aligned with its operational environment to facilitate performance of efficiency that is technically difficult and illusive in the absence of the present invention. The adaptive hybrid scheme of this invention facilitates enhanced performance and fuel savings for operators who use the vehicle in a similar fashion from day-to-day, where the recent vehicle history trains the vehicle to perform optimally in terms of performance and fuel savings.

Having described the preferred embodiment, it will become apparent that various modifications can be made without departing from the scope of the invention as defined in the accompanying claims.

The invention claimed is:

1. A method for controlling a hybrid vehicle, the method comprising:
   recording a historical load of a vehicle for a defined time period during or after operation of the vehicle;
   classifying the historical load for the defined time period in accordance with load category, including a first load category and a second load category wherein the classifying comprises classifying the historical load in accordance with a usage factor comprising a specific task;
   determining a present load associated with an electric drive;
   assigning a first slew rate control curve if the present load is consistent with the first load category and assigning a second slew rate control curve if the current load is consistent with the second load category for a duration after the defined time period based on the determined present load being consistent with the classified load category.

2. The method according to claim 1 wherein at least one of the load categories reflects a low duty with marked acceleration and cruising.

3. The method according to claim 1 wherein the determining comprises determining a present load category of the present load based upon a user input of a specific task.

4. The method according to claim 1 wherein the first slew rate control curve and the second slew rate control curve are expressed in terms of generator slew rate versus state of charge of an energy storage device of the vehicle.

5. The method according to claim 1 wherein the recording a historical load comprises recording a traction load associated with a traction load detector.

6. The method according to claim 1 wherein the assigning assigns the first slew rate control curve based on a first look-up table entry associated with the first load category and assigns the second slew rate control curve based on second look-up table entry associated with the second load category.

7. The method according to claim 1 wherein the first slew rate control curve is associated with a low duty load category, the first control curve comprising generally lower maximum generator currents than a reference control curve associated with a general purpose load category; the first control curve comprising an intermediate curve region of generally constant current over a wider state of charge range than that of the reference control curve.

* * * * *